United States Patent
Rieben

(10) Patent No.: US 6,698,669 B2
(45) Date of Patent: Mar. 2, 2004

(54) PIVOT FLOW JOINT FOR HIGH-PRESSURE FLOW DEVICES

(75) Inventor: Karl Rieben, Necker (CH)

(73) Assignee: Mosmatic Corporation, Bristol, WI (US)

(*) Notice: Subject to any disclaimer, the term of this patent is extended or adjusted under 35 U.S.C. 154(b) by 0 days.

(21) Appl. No.: 10/195,058

(22) Filed: Jul. 12, 2002

(65) Prior Publication Data
US 2003/0071141 A1 Apr. 17, 2003

(30) Foreign Application Priority Data
Jul. 20, 2001 (DE) .......................... 101 35 533

(51) Int. Cl.⁷ .............................................. B05B 3/00
(52) U.S. Cl. .................. 239/225.1; 239/251; 239/261; 239/263; 277/358; 277/367; 285/99; 285/14
(58) Field of Search ........................ 239/225.1, 251, 239/261, 263, 279, 280, 280.5; 277/358, 377, 367, 348, 427, 361; 285/14, 98.99, 106–7

(56) References Cited

U.S. PATENT DOCUMENTS

| | | | | |
|---|---|---|---|---|
| 3,697,088 A | * | 10/1972 | Hummer | 277/348 |
| 3,889,983 A | | 6/1975 | Freize et al. | |
| 3,967,841 A | * | 7/1976 | Kendrick et al. | 285/276 |
| 4,296,952 A | | 10/1981 | McCracken | |
| 4,396,212 A | * | 8/1983 | Honke | 285/94 |
| 4,752,077 A | * | 6/1988 | Hoffelner | 277/367 |
| 4,832,351 A | * | 5/1989 | Ciotola | 277/387 |
| 5,169,181 A | * | 12/1992 | Timm et al. | 285/276 |
| 5,456,413 A | * | 10/1995 | Ellis | 239/259 |
| 5,524,821 A | * | 6/1996 | Yie et al. | 239/10 |
| 5,577,775 A | * | 11/1996 | Pearson et al. | 285/24 |
| 6,039,320 A | * | 3/2000 | MacDonald | 277/370 |
| 6,109,546 A | * | 8/2000 | Ormiston | 239/245 |
| 6,302,335 B1 | * | 10/2001 | Ormiston et al. | 239/276 |
| 6,406,065 B1 | * | 6/2002 | Ott et al. | 285/120.1 |
| 6,439,478 B1 | * | 8/2002 | King et al. | 239/261 |
| 6,494,458 B2 | * | 12/2002 | Uth | 277/358 |
| 6,517,078 B2 | * | 2/2003 | Schruefer et al. | 277/398 |

FOREIGN PATENT DOCUMENTS

DE 94 14 482 9/1994

* cited by examiner

Primary Examiner—Henry Bennett
Assistant Examiner—Amanda Flynn
(74) Attorney, Agent, or Firm—Jansson, Shupe & Munger, Ltd

(57) ABSTRACT

A pivot flow joint for high-pressure fluid-flow devices of the type including a rotating flow member connected to a non-rotating flow member. The pivot flow joint includes first and second axially-aligned seal bushings secured to the non-rotating and rotating flow members, respectively, the first and second seal bushings having opposed adjoining contact surfaces. The seal bushings are biased toward one another for sealing engagement at such contact surfaces. Certain preferred embodiments involve spring-biasing the seal bushings toward one another and/or use of the high-pressure fluid to exert axial pressure for that purpose. The two seal bushings, which are preferably ceramic and of identical size and shape, carry out the sealing function of the pivot flow joint in the transition between the non-rotating and the rotating members of such joint.

30 Claims, 3 Drawing Sheets

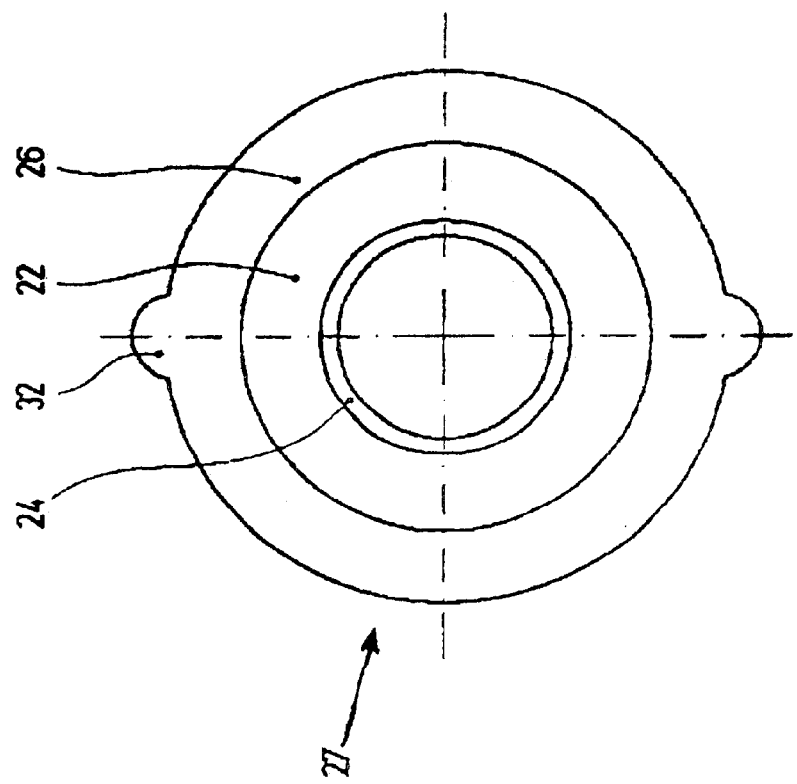
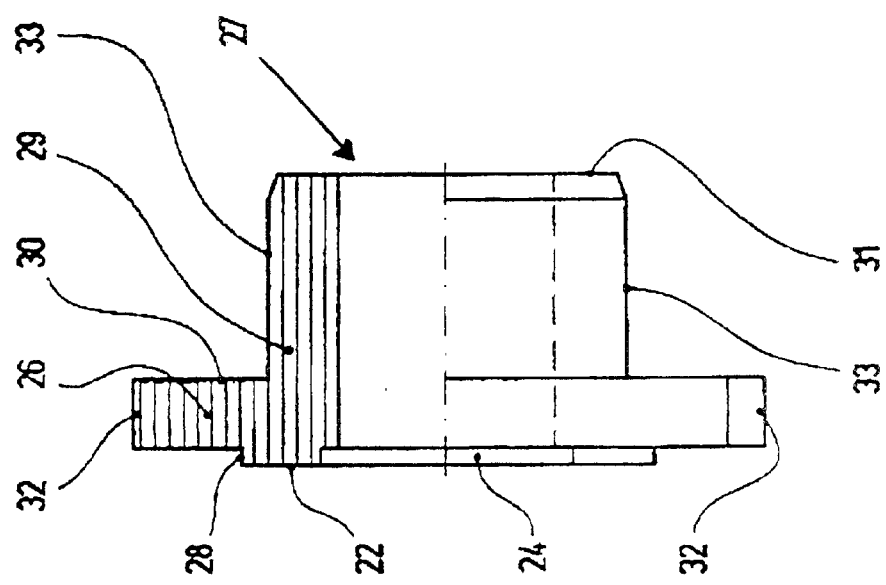
Fig. 3
Fig. 2

PIVOT FLOW JOINT FOR HIGH-PRESSURE FLOW DEVICES

FIELD OF THE INVENTION

This invention relates to pivot flow joints for high-pressure flow devices and, more particularly, to pivot flow joints for rotating spray arms mounted on stationary flow members.

BACKGROUND OF THE INVENTION

Pivot flow joints of the type first mentioned above are known from commonly-owned German Gebrauchsmuster No. G 94 14 482. Such pivot flow joints are used, in particular, in high-pressure cleaning equipment. A rotating (pivoting) part, e.g., a rotating spray arm for flow of high pressure liquid is mounted on a stationary flow member. Such devices, particularly the device of this invention, however, are not limited to use for rotating spray arms of high-pressure cleaning equipment. Such pivot joints can be used in a variety of applications involving flow of high-pressure fluids.

The above-referenced commonly-owned German Gebrauchsmuster 94 14 482 shows the general functioning of such pivot flow joint with sealing arrangements, and because such general functioning is also used in the pivot flow joint of this invention.

The sealing arrangements of such prior pivot flow joints, however, have certain disadvantages, with the result that such prior pivot flow joints did not achieve extended service lives. The period of their usefulness has been limited in time because their sealing arrangement consisted essentially of plastic seals in specific arrangements with O-rings. Because of their sealing arrangements, the rotational speeds of such prior pivot flow joints were limited, as was the temperature of the fluids to be passed through such pivot flow joints.

OBJECTS OF THE INVENTION

One object of this invention is to provide an improved pivot flow joint for high-pressure fluids overcoming the problems and shortcomings of prior pivot flow joints.

Another object of this invention is to provide an improved pivot flow joint for high-pressure fluids which permits considerably higher rotational speeds.

Another object of this invention is to provide an improved pivot flow joint for high-pressure fluids which permits flow of fluids at higher temperatures and allows high rotational speeds with such fluids.

Still another object of this invention is to provide an improved pivot flow joint for high-pressure fluids which allows extended service lives, while still providing the other advantages mentioned above.

These and other objects of the invention will be apparent from the following descriptions and from the drawings.

SUMMARY OF THE INVENTION

The invention is a pivot flow joint for high-pressure fluids which overcomes the above problems—allowing a considerably higher rotational speed at higher fluid temperatures over a considerably longer service life.

The device of the invention includes two sealing, oppositely-acting seal bushings arranged between non-rotating and rotating flow members. Each of the two seal bushings is secured to the corresponding flow member and the two seal bushings tightly adjoin one another in sealed engagement—preferably at a flat plane. That is, each seal bushing has a contact surface in tight engagement with the corresponding contact surface of the other seal bushing.

It is important that this contact plane be perpendicular to the direction of flow of the high-pressure fluid and extend radially with respect to the axis defined by the pivot flow joint.

In a preferred embodiment of the invention it is provided that each of the seal bushings be of a ceramic material. However, instead of a ceramic material, it is also possible for other materials to be used for the seal bushings; examples of acceptable materials include a sintered metal, a metal-plastic composite material, a hard metal or a ceramic composite material.

As indicated, the invention involves replacing known seals by two seal bushings contacting one another at adjoining contact surfaces. The seal bushings may be made to be mirror images of one another. It is preferred that the two seal bushings be spring-loaded against one another in their contact surface. The spring loading here is preferably achieved by two wave spring washers arranged on the sides of the seal bushings away from their contact surfaces; such spring washers cause the two seal bushings to abut one another under spring tension at the contact plane.

Each of the two seal bushings is sealed against its respective flow member (i.e., the non-rotating flow member or the rotating flow member) by an O-ring against the flow member.

The arrangement of bearings between rotating and non-rotating portions of the pivot flow device plays no essential role for the success of the invention, broadly defined. Thus, a variety of bearing arrangements can be used. One particularly preferred configuration includes at least one thrust bearing with axial grooved discs in position arranged two separated deep-groove ball bearings.

In one refinement of the invention the seal bushings are configured near their contact surfaces in a manner which serves to conduct fluid in the area of the contact surfaces toward a relief hole in an enclosing sleeve or otherwise to a relief channel, depending on the outer configuration of the pivot flow joint. Thus, if there should be a failure of the sealing engagement of the two seal bushings, any fluid building up will be diverted to the exterior via the relief hole, rather than reach the interior area where the bearings are housed, which could damage the bearings.

Failures from wear and tear can occur only after very long running times. However, when and if any such failure occurs, the escape of fluid through the relief hole allows one to recognize that the seal bushings are worn; thus, they can then be replaced at the appropriate time.

With the present invention, which provides two seal bushings engaging one another under spring loading, an easily rotating pivot flow joint is provided. When compared to prior devices, the pivot flow joint of this invention has a considerably longer service life, at a higher rotational speed and higher temperatures of the high-pressure fluid which is flowing.

It should also be especially noted that the pivot flow joint of this invention can be used not just with aqueous fluids, but with non-aqueous high-pressure fluids. The pivot flow joint of this invention can be used in situations involving pressures of up to 300 bar and temperatures between 5 and 200° C., and at such pressures and temperatures can operate at speeds as high as 2000 rpm. Furthermore, the fluid may have a pH anywhere within the range of 3 to 12. The aforementioned values for various parameters are merely exemplary, and may be considerably exceeded.

The performance of the pivot flow joint of this invention results not only from features of individual claims, but from combinations of the features of the invention. All specifications and characteristics disclosed in this document, including in the abstract, and in particular the configurations represented in the drawings, are set forth as not claimed as essential to the invention.

The invention is also described as an improvement in pivot flow joints for high-pressure fluid-flow devices of the type including a rotating flow member connected to a non-rotating flow member. The improvement includes first and second axially-aligned seal bushings secured to the non-rotating and rotating flow members, respectively, the first and second seal bushings having opposed adjoining contact surfaces and being biased toward one another for sealing engagement at such contact surfaces.

In highly preferred embodiments, the seal bushings are configured and arranged such that the high-pressure fluid in the pivot flow joint exerts axial pressure biasing the seal bushings toward one another. It is also preferred that the first and second bushings be spring-biased toward one another.

The first and second seal bushings are preferably sealed by O-rings against the non-rotating and rotating flow members, respectively. The pivot flow joint also preferably includes a sleeve over the rotatable flow member which encloses the seal bushings. The rotatable flow member is seated radially against the sleeve by first bearings which facilitate rotation of the rotatable flow member with respect to the sleeve. Such a sleeve most preferably has a relief hole therethrough to allow outflow of fluid, such that any incipient non-integrity of the pivot flow joint can be noted. The rotatable flow member is also seated axially against the sleeve by a thrust bearing that further facilitates rotation of the rotatable flow member with respect to the sleeve. The pivot flow joint also preferably includes sealing devices which serve to isolate all of the bearings to protect them against the intrusion of moisture.

The non-rotating flow member of the pivot flow joint has an inflow side which includes a device for connection to the high-pressure fluid supply, and the rotating flow member has an outflow side which includes a device for connection to a rotating device to be operated.

The contact surfaces of the first and second seal bushings are preferably flat annular surfaces. The first and second seal bushings are preferably formed of ceramic material, as noted above, and they are most preferably of identical shape and size.

In preferred embodiments, the first seal bushing is non-rotatably secured with respect to the non-rotating flow member, and the second seal bushing is non-rotatably secured with respect to the rotatable flow member such that the second seal bushing and rotatable flow member rotate together.

More broadly, the invention is an improvement in pivot flow joints of the type including relatively-rotatable first and second flow members, the improvement involving first and second axially-aligned seal bushings (as described above) secured to the first and second flow members, respectively. As described above, the first and second seal bushings have opposed adjoining contact surfaces and are biased toward one another for sealing engagement at such contact surfaces.

The invention is explained in greater detail below on the basis of drawings illustrating only one route of embodiment. Additional essential characteristics and advantages of the invention are evident from the drawings and the description thereof.

BRIEF DESCRIPTION OF THE DRAWINGS

FIG. 2 is an enlarged partial sectional of one of the seal bushings.

FIG. 3 is a left side view of FIG. 2.

DETAILED DESCRIPTION OF PREFERRED EMBODIMENTS

Figure 1:
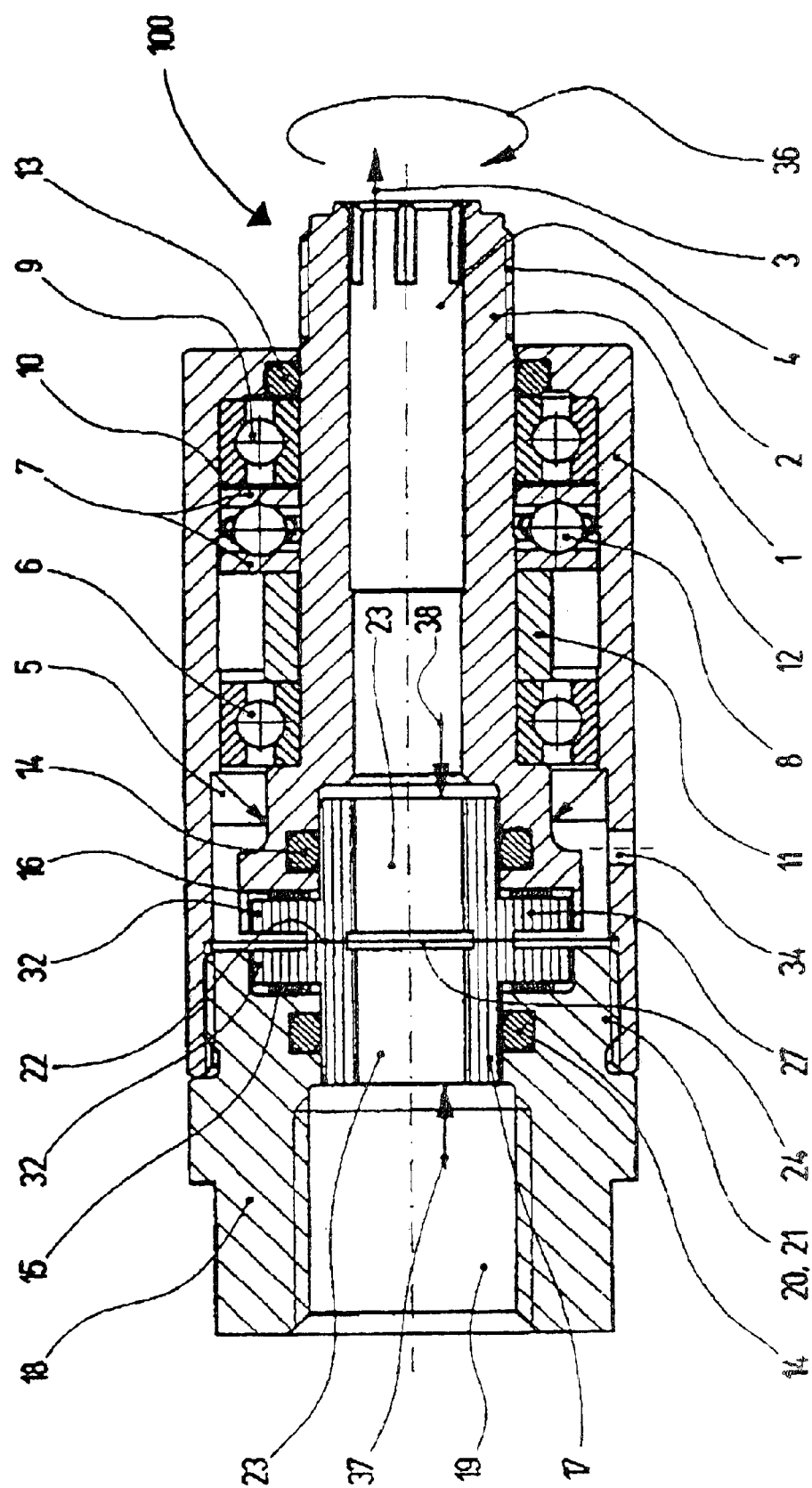
FIG. 1 is a side sectional of a pivot flow joint according to the invention.
Figure 4:
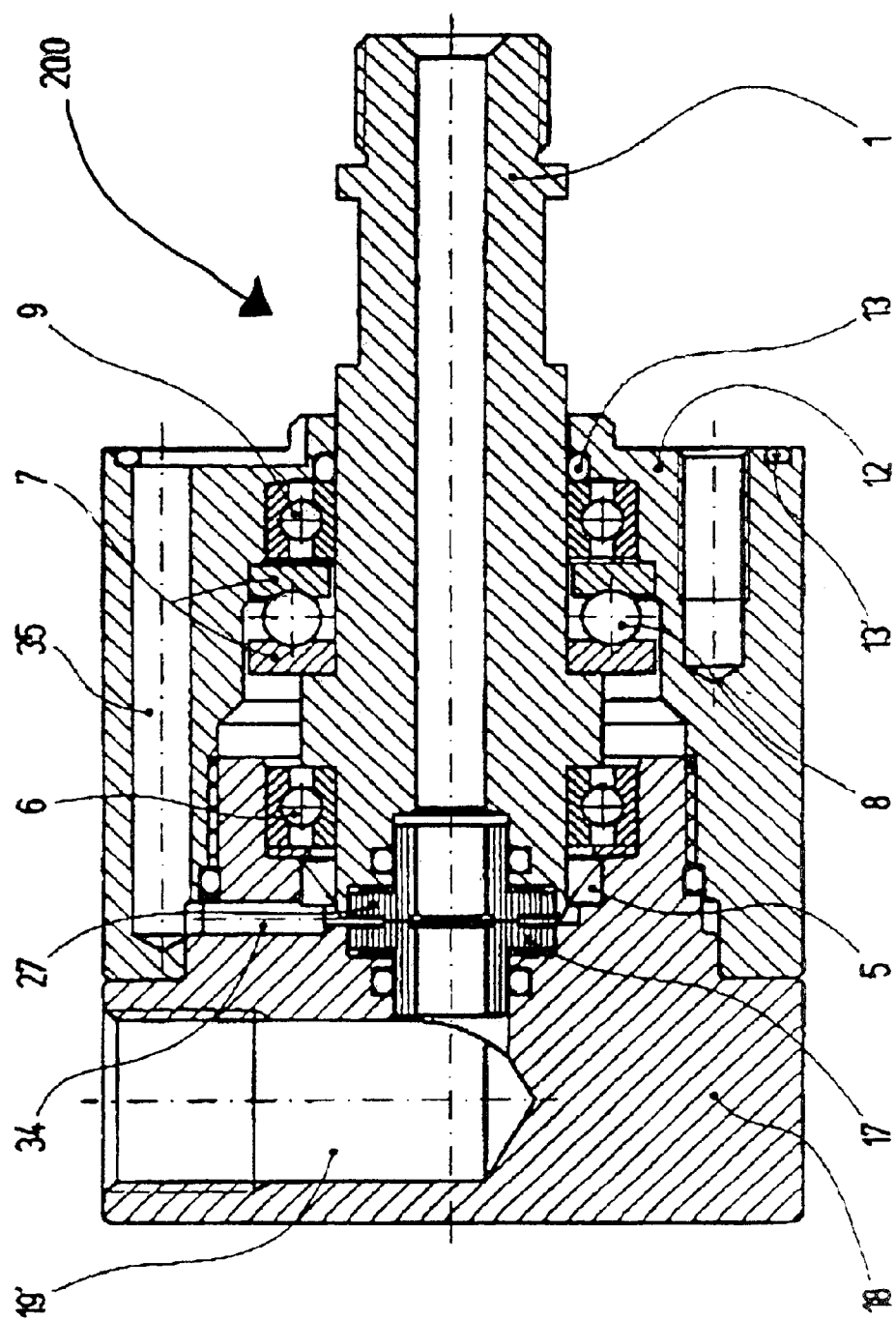
FIG. 4 is a side sectional view of another embodiment of the invention.

In the embodiments of FIGS. 1 and 4, a rotating inside flow member 1 is provided, having an external thread 2 on which a connector thread can fit. Inside flow member 1 forms a central channel 4 through which the high-pressure fluid flows in the direction of arrow 3.

Referring to pivot flow joint 100 of FIG. 1, inside flow member 1 is seated rotatably in a sleeve 12, which in turn is connected to a stationary closure bolt 18 via a thread 20 having an adhesive bond 21. Sealing contact between rotating inside member 1 and stationary sleeve 12 is accomplished via a lip seal 5 which is adjacent to the main arrangement of bearings. Arrow 36 indicates the direction of rotation that inside member 1 has with respect to sleeve 12 when properly driven.

The bearing arrangement itself consists of two deep-groove ball bearings 6 and 9 spaced from one another, between which a thrust ball bearing 8 is arranged. It is obviously also possible for several thrust ball bearings 8 to be provided or for the bearing arrangement to be modified in a number of other ways. Thrust ball bearing 8 has axial grooved discs 7 which are part of thrust ball bearing 8. Axial grooved discs 7 are separated via a spacer disc 10 from deep-groove ball bearing 9. Between deep-groove ball bearing 6 and thrust ball bearing 8 is a spacer bushing 11. Sleeve 12 is sealed at the top by an O-ring 13 on the periphery of inside member 1.

Of importance to this invention is that the sealing provided between rotating inside member 1 and stationary closure bolt 18 is accomplished by two seal bushings 17 and 27, as discussed above. Seal bushings 17 and 27 are of identical size and shape and are arranged mirror-symmetrically to one another. Seal bushings 17 and 27 each have a contact surface 22 and these surfaces are adjoining one another such that a relatively-rotating sealing function is carried out.

The structure of each seal bushing 17 and 27 is illustrated further in FIGS. 2 and 3. Each seal bushing has on its end face a recess which acts as pressure relief surface 24. Radially adjoining pressure-relief surface 24 on the end face is contact surface 22, which transitions via a shoulder 28 into a radially outward flange 26. Two tabs 32, which are preferably (as shown) diametrically opposing one another and extending radially outwards, are arranged on the outer periphery of flange 26.

Tabs 32 of seal bushing 17 engage in recesses (not shown) in the closure bolt 18; in this manner, seal bushing 17 is non-rotatably coupled to closure bolt 18. However, tabs 32 of seal bushing 17 do allow an axial play of the entire seal bushing 17, because seal bushing 17 is spring-biased by a wave spring washer 15 in the axial direction opposite to the axial direction of the spring-biasing of seal bushing 27.

Seal bushings 17 and 27 each have an internal flow channel 23 so that the two channels 23 thereof are in precise alignment with one another.

On each of seal bushings 17 and 27, a sleeve neck 29 extends axially from flange 26. The outer surface of sleeve neck 29 forms the sealing surface 33 for two O-rings 14 which are spaced from one another.

As for seal bushing 17, seal bushing 27 is spring-loaded by a wave spring washer (in this case wave spring washer 16) against the opposing sealing bushing 17. It is evident that only one wave spring washer 15 or 16 can be present, since all that matters is that there be spring-loading between contact surfaces 22 of seal bushings 17 and 27. In addition to being spring-loaded by wave spring washer 16, seal bushing 27 is also non-rotatably coupled with respect to inside flow member 1—so that it rotates with inside flow member 1. Thus, seal bushing 27 rotates with respect to seal bushing 17, which does not rotate; their respective annular contact surfaces are in rubbing engagement with one another. Each of the wave spring washers 15 and 16 exerts its axial spring force on one of seal bushings 17 and 27 in the area of surface 30 on flange 26.

The end faces of sleeve necks 29 each form pressure surfaces 31. Here the high-pressure fluid in pivot flow joint 100 acts either in the direction of arrow 37 or in the direction of arrow 38—so that the high-pressure fluid further presses the two seal bushings 17 and 27 together, even though the fluid is flowing in the direction of arrow 3. This fluid force, therefore, serves to further improve the sealing engagement between contact surface 22 of the two seal bushings. In other words, the spring action of wave spring washers 15 and 16 is further assisted by the arrangement of the two pressure surfaces 31 which lie exposed to the high-pressure fluid.

Seal bushings 17 and 27 are seated in the manner explained—floating in a central space between non-rotating closure bolt 18 and rotating inside flow member 1. Thus, there is an axial displacement capability and the two seal bushings can move radially to some extent, since they also have radial play in the area of the internal hole.

A relief hole 34 is arranged in stationary sleeve 12 and is placed in a manner to conduct fluid that has escaped between contact surfaces 22 and flowed into and from the space formed between the non-rotatable and rotatable seal bushings 17 and 27. If there is wear and tear in the area of contact surface 22 after a long period of operation, then high-pressure fluid will drip from relief hole 34. This is an indication that seal bushings 17 and 27 should be replaced.

FIG. 4 illustrates a pivot flow joint 200 which is another embodiment of the invention—a minor variation in the invention. It, too, has a relief hole 34 allowing outflow, in this case to an axial relief channel 35. Referring more generally to pivot flow joint 200 of FIG. 4, instead of receptacle hole 19 it has a receptacle hole 19' which is offset by an angle of 90°. It is not important that the direction of the high-pressure fluid flow be linear; what matters is only the flow rate, i.e., the pressure difference from the normal pressure prevailing on the outside.

In pivot flow joint 200, sleeve 12 has a threaded receptacle on its end face, by which sleeve 12 is screw engaged with the non-rotatable flow member. Instead of the threaded connection for the sleeve 12 of pivot flow joint 200, the sleeve can be provided with an outside thread, by which it can be screwed onto a housing surface with the assistance of appropriate connectors.

Pivot flow joint 200 of FIG. 4 is suitable for surface cleaners, because in such devices high-pressure fluid reaches the pivot flow joint at an angle. Pivot flow joint 100 of FIG. 1 serves a variety of fluid-flow tasks in which the intention is to introduce a high-pressure fluid into a rotating connection.

In summary, the invention is a pivot flow joint for high-pressure devices allowing connection of a rotating flow member to a non-rotating flow member. It is characterized by having two oppositely-biased or oppositely acting seal bushings 17 and 27 arranged between rotating and non-rotating flow members. The seal bushings have adjoining contact surface 22 which carry out the sealing function of the pivot flow joint—at the point of transition between the non-rotating and rotating members of the pivot flow joint.

The pivot flow joint of this invention is constructed such that seal bushings 17 and 27 apply axial pressure one on the other. The pressure is exerted either by a spring washer, such as by a wave spring washer, or by corresponding other means. Pressure can also be applied by virtue of the high-pressure fluid.

The highly preferred ceramic material used for the two seal bushings of the pivot flow joint of this invention guarantees high resistance against mechanical degradation and against negative thermal and chemical effects.

While the principles of this invention have been described in connection with specific embodiments, it should be understood clearly that these descriptions are made only by way of example and are not intended to limit the scope of the invention.

What is claimed is:

1. In a pivot flow joint for high-pressure fluid-flow devices of the type including a rotating flow member connected to a non-rotating flow member, the improvement comprising first and second axially-aligned seal bushings secured to the non-rotating and rotating flow members, respectively, the first and second seal bushings having opposed adjoining axially-facing contact surfaces and being separately axially biased toward one another for sealing engagement at such axially-facing contact surfaces, the separate axial biasing including the first seal bushing being biased toward the second seal bushing by a first biasing element and the second seal bushing being biased toward the first seal bushing by a second biasing element.

2. The pivot flow joint of claim 1 wherein the seal bushings are configured and arranged such that the high-pressure fluid in the pivot flow joint exerts axial pressure biasing the seal bushings toward one another.

3. The pivot flow joint of claim 1 further including a sleeve over the rotatable flow member and enclosing the seal bushings, the rotatable flow member being seated radially against the sleeve by first bearings facilitating rotation of the rotatable flow member with respect to the sleeve.

4. The pivot flow joint of claim 3 wherein the sleeve has a relief hole therethrough to allow outflow of fluid, whereby any incipient non-integrity of the pivot flow joint can be noted.

5. The pivot flow joint of claim 3 wherein the rotatable flow member is seated axially against the sleeve by a thrust bearing which further facilitates rotation of the rotatable flow member with respect to the sleeve.

6. The pivot flow joint of claim 5 further including sealing devices isolating all of the bearings to protect them against the intrusion of moisture.

7. The pivot flow joint of claim 6 wherein the sleeve has a relief hole therethrough to allow outflow of fluid, whereby any incipient non-integrity of the pivot flow joint can be noted.

8. The pivot flow joint of claim 1 wherein:
    the non-rotating flow member has an inflow side including a device for connection to the high-pressure fluid supply; and
    the rotating flow member has outflow side including a device for connection to a rotating device to be operated.

9. The pivot flow joint of claim 1 wherein the first and second seal bushings are separately biased toward one another by wave spring washers.

10. The pivot flow joint of claim 1 wherein the first and second seal bushings are axially movable.

11. In a pivot flow joint for high-pressure fluid-flow devices of the type including a rotating flow member connected to a non-rotating flow member, the improvement comprising first and second axially-aligned seal bushings secured to the non-rotating and rotating flow members, respectively, the first and second seal bushings having opposed adjoining contact surfaces and each seal bushing being separately spring-biased toward the other seal bushing for sealing engagement at the contact surfaces.

12. The pivot flow joint of claim 11 wherein the seal bushings are configured and arranged such that the high-pressure fluid in the pivot flow joint exerts axial pressure biasing the seal bushings toward one another.

13. The pivot flow joint of claim 11 wherein the first and second seal bushings are sealed by O-rings against the non-rotating and rotating flow members, respectively.

14. The pivot flow joint of claim 11 wherein the first seal bushing is biased toward the second seal bushing by a first spring element and the second seal bushing is biased toward the first seal bushing by a second spring element.

15. The pivot flow joint of claim 11 wherein the first and second seal bushings are separately biased toward one another by wave spring washers.

16. The pivot flow joint of claim 11 wherein the first and second seal bushings are axially movable.

17. In a pivot flow joint for high-pressure fluid-flow devices of the type including a rotating flow member connected to a non-rotating flow member, the improvement comprising first and second axially-aligned seal bushings secured to the non-rotating and rotating flow members, respectively, the first and second seal bushings having opposed adjoining axially-facing contact surfaces and being axially biased toward one another for sealing engagement at such axially-facing contact surfaces, the first seal bushing being non-rotatably secured with respect to the non-rotating flow member; and the second seal bushing being non-rotatably secured with respect to the rotatable flow member such that the second seal bushing and rotatable flow member rotate together.

18. The pivot flow joint of claim 17 wherein the first and second seal bushings are formed of ceramic material.

19. The pivot flow joint of claim 17 wherein the seal bushings are configured and ranged such that the high-pressure fluid in the pivot flow joint exerts axial pressure biasing the seal bushings toward one another.

20. The pivot flow joint of claim 17 wherein the first and second seal bushings are biased toward one another by wave spring washers.

21. In a pivot flow joint for high-pressure fluid-flow devices of the type including first and second relatively-rotatably flow members connected together, the improvement comprising first and second axially-aligned seal bushings secured to the first and second flow members, respectively, the first and second seal bushings being of identical shape and size, having opposed adjoining contact surfaces and being biased toward one another for sealing engagement at such contact surfaces.

22. The pivot flow joint of claim 21 wherein the seal bushings are configured and arranged such that the high-pressure fluid in the pivot flow joint exerts axial pressure biasing the seal bushings toward one another.

23. The pivot flow joint of claim 21 wherein the first and second bushings are spring-biased toward one another.

24. The pivot flow joint of claim 23 wherein the seal bushings are configured and arranged such that the high-pressure fluid in the pivot flow joint exerts axial pressure biasing the seal bushings toward one another.

25. The pivot flow joint of claim 21 wherein the first and second seal bushings are biased toward one another by wave spring washers.

26. In a pivot flow joint for high-pressure fluid-flow devices of the type including first and second relatively-rotatably flow members connected together, the improvement comprising first and second axially-aligned seal bushings secured to the first and second flow members, respectively, the first and second seal bushings having opposed adjoining axially-facing contact surfaces and being axially biased toward one another by separate biasing elements for sealing engagement at such axially-facing contact surfaces.

27. The pivot flow joint of claim 26 wherein the adjoining contact surfaces of the first and second seal bushings are flat annular surfaces.

28. The pivot flow joint of claim 26 wherein the seal bushings are configured and arranged such that the high-pressure fluid in the pivot flow joint exerts axial pressure biasing the seal bushings toward one another.

29. The pivot flow joint of claim 26 wherein the biasing elements are spring elements and the first and second seal bushings are spring-biased toward one another for sealing engagement.

30. The pivot flow joint of claim 26 wherein each of the biasing elements is a wave spring washer.

* * * * *